United States Patent [19]
Kitamura

[11] 4,450,939
[45] May 29, 1984

[54] MUSIC BOX OPERATION STOPPING MECHANISM

[75] Inventor: Yoshio Kitamura, Nagano, Japan

[73] Assignee: Kabushiki Kaisha Sankyo Seiko Seisakusho, Nagano, Japan

[21] Appl. No.: 289,649

[22] Filed: Aug. 3, 1981

[30] Foreign Application Priority Data

Aug. 4, 1980 [JP] Japan ............... 55-110367[U]
Apr. 7, 1981 [JP] Japan ............... 56-50260[U]

[51] Int. Cl.³ ............... F03G 1/08; G10F 1/06
[52] U.S. Cl. ............... 185/39; 84/95 R; 185/DIG. 1
[58] Field of Search ............... 185/37, 39, DIG. 1; 84/95 R, 95 C; 46/117, 118, 175 AR

[56] References Cited
U.S. PATENT DOCUMENTS 2,795,294  6/1957  Francis ............... 185/39
3,610,369  10/1971 Rodgers ............... 84/95 R
3,820,432  6/1974  Fishbein ............... 185/39 X

*Primary Examiner*—Allan D. Herrmann
*Attorney, Agent, or Firm*—Sughrue, Mion, Zinn, Macpeak, and Seas

[57] ABSTRACT

A music box operating stopping mechanism in which a pull string for winding a coil string can be stopped with a very small force so as to prevent the skin of a finger from being caught by the string as passes through a hole in the case of the music box. A locking member is provided which can pass in and out of the region of rotation of an air braking type speed governor plate which is driven by the coil spring. The locking member is urged out of the region of rotation of the governor plate with an elastic force which is much smaller than the elastic force of the coil string. The string is engaged with the locking member so that when the string is pulled outwardly during playing of music, the locking member is moved into the region of rotation of the governor plate against the elastic force of the string.

17 Claims, 10 Drawing Figures

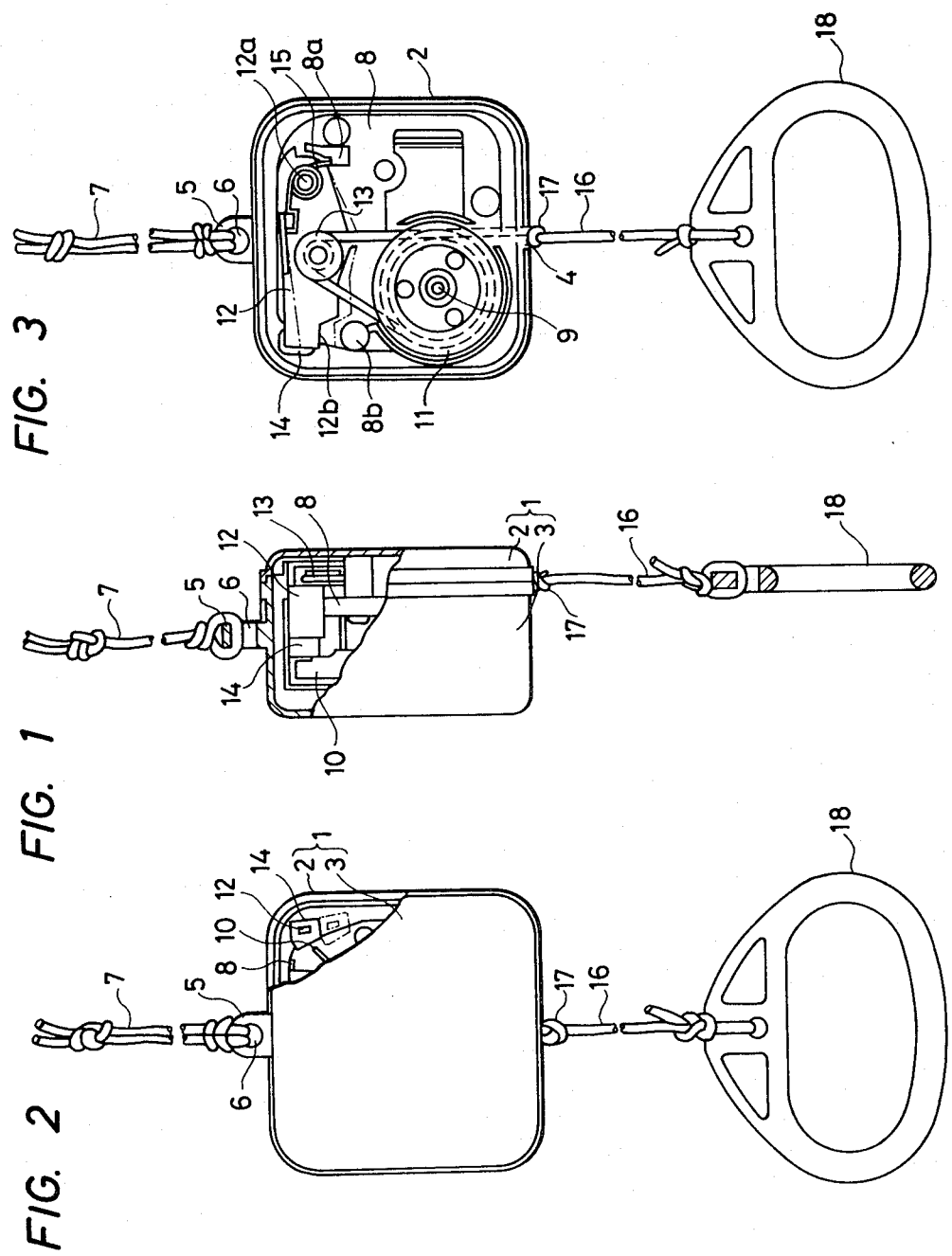

MUSIC BOX OPERATION STOPPING MECHANISM

BACKGROUND OF THE INVENTION

The present invention relates to coil spring winding mechanisms, and more particularly to a coil spring winding mechanism in which an unwound coil spring can be rewound or unwinding the coil spring can be stopped with a very small force.

The invention is applicable to a variety of coil-spring winding mechanisms such as coil-spring operated toys or timer switches, and especially to a music box which generates musical sound by the utilization of the unwinding force of a coil spring.

In some music boxes, a winding drum in the form of a pulley is fixedly secured to a coil spring mounting shaft, a coil spring winding string is wound on the winding drum, and the string is pulled out of a case through a small hole cut in the latter. In a music box of this type, as the string is pulled out of the case against the elastic force of the spring, the coil spring winding shaft is rotated to wind the coil spring. Upon releasing the string, the coil spring is unwound to turn the winding drum in the opposite direction to wind the spring thereon. In this operation, the string outside the case is caused to enter the case.

Since the unwinding force of the coil spring is considerably large, if a part of a finger is placed at the small hole while the string is entering the case, the skin of the finger may be caught up thereby. Therefore, the above-described music box is hazardous for babiess and young children.

SUMMARY OF THE INVENTION

An object of the invention is thus to provide a music box operation stopping mechanism in which the above-described drawbacks accompanying a conventional music box have been eliminated.

In the fundamental arrangement of a mechanism for stopping the operation of a music box in which a coil spring and air braking type speed governor plate driven by the coil spring are mounted in a case and a coil spring winding string is pulled out of the case through a small hole cut therein. According to the invention, a locking member is provided which can pass in and out of the region of rotation of the governor plate freely. The locking member is urged out of the region of rotation with an elastic force much smaller than the elastic force of the coil spring. The string is engaged with the locking member so that, when the string is pulled out, the locking member is disposed into the region of rotation of the governor plate against the elastic force of the spring.

BRIEF DESCRIPTION OF THE DRAWINGS

FIG. 1 is a side view of a music box according to a first embodiment of the invention;

FIG. 2 is a front view, with parts cut away, of the music box of FIG. 1;

FIG. 3 is a rear view of the music box of FIG. 1 with a frame mounting member removed from a frame;

DESCRIPTION OF THE PREFERRED EMBODIMENTS

Figure 4:
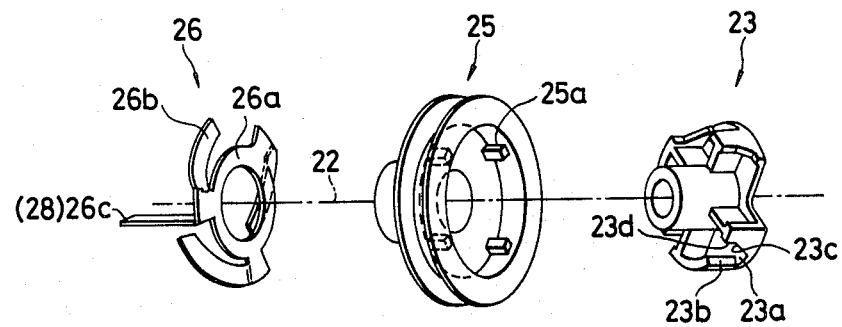
FIG. 4 is an exploded perspective view of essential components of a music box according to a second embodiment of the invention.

A preferred embodiment of the invention will be described with reference to FIGS. 1 through 3.

As shown in FIG. 1, a case 1 is constructed of a square frame mounting member 2 and a box-shaped cover 3 which is detachably secured to the frame mounting member 2 (see FIGS. 2 and 3). A small hole 4 is cut in the engaging edge of the frame mounting member 2 which engages the engaging edge of the cover 3 through which a pull string is inserted. That is, the hole 4 is used to extend the string outside the case. A protrusion 5 is formed integral with the side of the cover 3 opposite to the side where the small hole 4 is provided. The protrusion 5 has a hole 6 into which a suspending string 7 is inserted. The suspending string 7 is tied to the protrusion 5 after being inserted into the hole 6.

A frame 8 incorporated in the case 1 is mounted on the cover 3. A coil spring mounting shaft 9 is rotatably supported by the frame 8 as shown in FIG. 3. A coil spring (not shown) is interposed between the spring mounting shaft 9 and the frame 8.

A music performing drum (not shown) with music performing protrusions on its cylindrical wall is rotatably supported by the frame 8. The drum is coupled to the coil spring mounting shaft 9 through a ratchet mechanism (not shown) composed of a gear train (not shown) in such a manner that the drum is rotated only by the rotation of the coil spring mounting shaft 9 which is effected when the spring is unwound. The drum is coupled through a gear train (not shown) to an air braking type speed governor plate 10 which is rotatably mounted on the frame 8. As the drum is rotated, sound generating vibrating reeds (not shown) mounted adjacent to the drum on the frame are struck by the music performing protrusions, thus performing the music.

In the figures, reference numeral 11 designates a string winding drum fixedly secured to the spring mounting shaft 9, 12 a lever having one end portion rotatably supported by the frame 8, and 12a shaft for rotatably supporting the lever 12 on the frame. The free end portion of the lever 12 is caused to move back and forth with respect to the string winding drum 11 as the lever 12 swings or rocks. A pulley 13 is mounted at the middle portion of the lever 12. A locking member 14 for stopping the rotation of the governor plate 10 is secured to the free end portion of the lever 12. The locking member 14 moves into the region of rotation of the governor plate 10 when the lever 12 approaches the string winding drum 11 and it moves out of the region of rotation when the lever 12 moves away from the drum 11.

A spring 15 supported by the shaft 12a is interposed between the lever 12 and the spring locking protrusion 8a of the frame 8. The spring 15 urges the lever 12 to move away from the string winding drum 11. The elastic force of the spring 15 is much smaller than that of the coil spring described above.

One end portion of the spring winding string 16 is wound on the string winding drum 11 with the tip of the end portion fixedly secured to the drum 11. The string 16 is laid over the pulley 13 and is then pulled outside the case 1 through the small hole 4. A know 17 is formed in the string 16 outside the case so that, when the string 16 is maximally wound on the string winding drum 11, the knot 16 is engaged with the rim of the small hole 4 to stop the winding operation of the drum 11. The other end portion of the string 16 is tied to the knob 18 outside the case 1.

The music box operation stopping mechanism thus constructed operates as follows:

Pulling the string 16 with the knob 18 causes the lever 12 to move towards the string winding drum 11 against the elastic force of the spring 15. As a result, the locking member 14 moves into the region of rotation of the governor plate 10 and the end portion 12b of the lever 12 abuts against the pin 8b of the frame 8. Under this condition, the locking member 14 engages with the governor plate 10, and accordingly the governor plate 10 and the music performing drum (not shown) cannot rotate.

When, under this condition, the knob 18 is pulled further, the coil spring mounting shaft 9 is turned while the string 16 is unwound from the string winding drum 11 so that the string 16 is further extended outside the case 1. As a result, the spring is wound.

Upon releasing the knob 18, the lever 12 is swung by the elastic force of the spring 15 so as to move away from the string winding drum 11. As a result, the locking member 14 is retracted from the region of rotation of the governor plate while a part of the string 16 goes into the case 1. Thus, the governor plate 10 can freely turn.

In other words, upon releasing the knob 18, the coil spring starts unwinding to rotate the coil spring mounting shaft 9 so that the music performing drum (not shown) is rotated to perform the music. In this operation, the string 16 is partially wound on the string winding drum after entering the case 1. When the string 16 is wound maximally, the knot 17 is engaged with the small hole 4.

If, while the string 16 is entering the case by the coil spring unwinding force, the string 16 is pulled with a force which is much smaller than the elastic force of the coil spring but slightly larger than the elastic force of the spring 15, the lever 12 will be swung towards the string winding drum 11 against the elastic force of the spring 15 by the tension acting on the string as a result of which the locking member 14 enters the region of rotation of the governor plate 10 to the position indicated by the broken line in FIG. 2 or 3. Accordingly, the governor plate 10 abuts against the locking member 14 stopping the unwinding operation of the coil spring. In this case, the unwinding force of the coil spring does not act on the string. Instead only the small elastic force of the spring 15 acts on the string 16. Thus, the operation, or the music performance, of the music box is easily stopped. This also occurs if a part of a finger is caught up by the string 16 and the small hole 4.

The lever is swing by pulling the string 16. Therefore, the string 16 can be extended outside the case in a different direction by changing the engagement position of the string 16 and the lever 12 or by modifying the configuration of the lever 12. In the above-described embodiment, the pulley 13 is provided at the engagement position of the string 16 and the lever 12. However, instead of the pulley 13 a roller may be employed.

The music box operation stopping mechanism as constructed above according to the invention has the following advantageous effects:

(1) Unwinding the coil spring is stopped merely by exerting on the string a tension which is much smaller than the elastic force of the coil spring. Therefore, even if a part of the finger is caught up by the string in the small hole, only a very small clamping force acts on the finger. Thus, all danger of physical injury is eliminated.

(2) The direction in which the string is extended outside the case is the same as that of the conventional music box. Therefore, the mechanism of the invention is applicable to conventional music boxes, and it is unnecessary to modify them when the mechanism of the invention is used.

(3) The mechanism of the invention can be applied to a music box having a deep case.

(4) Since the mechanism of the invention does not use a quick return system, the knob or the like will never be caused to strike against the face or hands.

Figure 5:
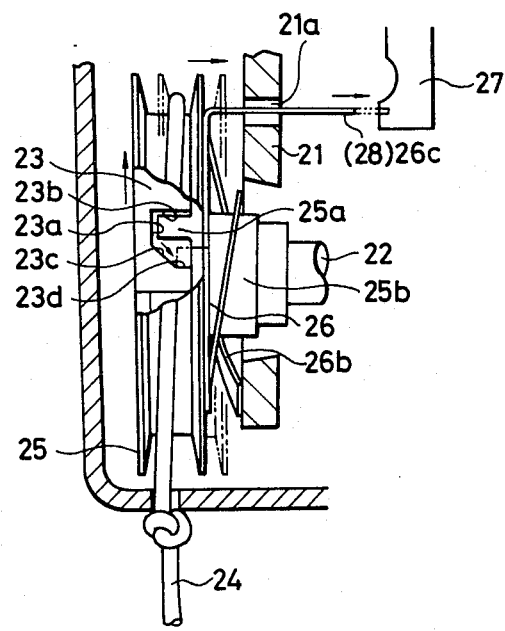
FIG. 5 is a sectional view, with parts cut away, showing essential components of the music box of FIG. 4.
Figure 6:
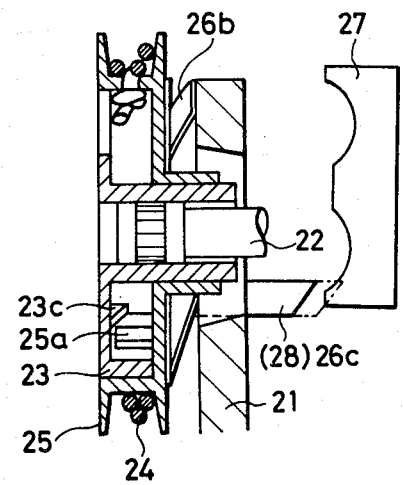
FIG. 6 is a sectional view showing essential components of the music box in FIG. 4.

Another embodiment of the invention is shown in FIGS. 4 through 6 in which reference numeral 21 designates the frame of a music box and 22 the spring winding shaft of the music box onto which cylindrical drum-shaped pulley receiver 23 is fitted. A pull string 24 is wound on a pulley 25 several turns. The pulley 25 is loosely fitted on the cylindrical outer wall of the pulley receiver 23 in such a manner that it is rotatable and slidable in the axial direction.

A clutch is provided between the pulley receiver and the pulley. The clutch is formed as follows: A plurality of engaging protrusions 25a are provided on the inner wall of the pulley 25 at equal intervals and are inserted into corresponding recesses 23a which are formed in the cylindrical inner wall of the pulley receiver 23 at equal intervals. One side of each recess 23a is formed into a following edge 23b which is abutted against one side of the respective protrusion 25a, and the opposite side of the recess 23a is formed as a ramp or slope 23c on which the engaging protrusions 25a ride and a blocking edge 23d merging with the slope 23c. A spring structure 26 urging the pulley 25 leftward as viewed in FIG. 5 is interposed between the pulley 25 and the frame 21.

In the spring structure 26 of this embodiment, elastic legs 26b extend obliquely in the same circumferential direction from the periphery of an annular plate 26a. The boss 25b of the pulley 25 is loosely fitted into the hole of the annular plate 26a in such a manner that the annular plate 26a is slidably in contact with one surface of the pulley 25 and the elastic legs 26b are also slidably in contact with one surface of the frame 21.

A stop 28 is provided for the governor plate 27 of the music box which can enter the region of rotation of the governor plate 27.

In this embodiment, the stop 28 is formed as follows: A protruding rod 26c is formed integrally with the annular plate 26a in such a manner that it can freely move in and out of the region of rotation of the governor plate 27 through a hole 21a formed in the frame 21. The hole 21a serves also to stop the rotation of the spring device 26.

In operation, with the string 24 in the state shown in FIG. 5, the pulley 25 is turned with the cylindrical wall of the pulley receiver 23 as a guide until the engaging protrusions 25a of the pulley 25 ride on the removing slopes 23c whereupon the elastic legs 26b of the spring device 26 are compressed and accordingly the protruding rod 26c engages the governor plate 27. When the engaging protrusion 25a engage the blocking edges 23d after reaching the tops of the slopes 23c, the pulley receiver 23 is driven to rotate since the pulley 25 is being rotated by pulling the string. As a result, the spring winding shaft 22 is turned to wind the spring. Upon releasing the string, the pulley 25 is pushed back leftward and restored by the force of the stop 28 as shown in FIG. 5, as a result of which the music box plays its music.

The operation of stopping the music performance of the music box of this embodiment will be described. It is assumed that in the state shown in FIG. 5 the music box is playing music and the spring is being unwound. If, under this condition, the string 24 is pulled similarly as in the spring winding operation, the pulley is maintained disengaged from the spring winding shaft until the protrusions 25a of the pulley 25 abut against the blocking edges 23d after passing through the tops of the slopes 23c of the pulley receiver 23. Accordingly, the spring's strong unwinding force is not exerted on the pulley, and therefore the music box is operated with a small force.

Figure 7:
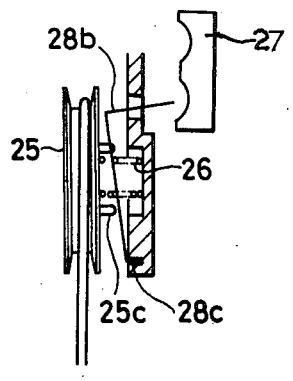
FIGS. 7 and 8 are a side view and a plan view showing a music box according to a third embodiment of the invention.
Figure 8:
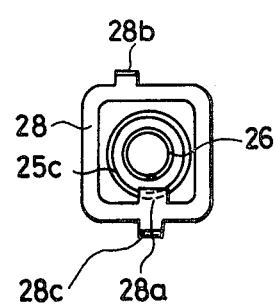

A modification of this embodiment is shown in FIGS. 7 and 8. In the modification, a spring 26 for returning the pulley and a stop 28 are formed separately. The stop 28 is in the form of a frame having a stopping portion 28a at one side and a free portion 28b at the opposite side. The stopping portion 28a is pressed into the frame 21 so that the stop is fixedly secured to the frame 21. The free portion 28 extends towards the governor plate 27. The stop 28 has an abutting portion 28c which is depressed by a depressing ring provided on a pulley 25. A spring 26 is a coil spring which is slidably interposed between the frame 21 and the pulley 25.

Figure 9:
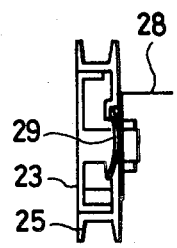
FIG. 9 is a sectional side view of a music box according to a fourth embodiment of the invention.
Figure 10:
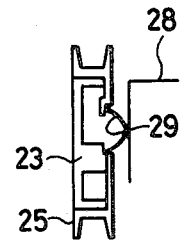
FIG. 10 is an explanatory diagram showing an operating state of the music box in FIG. 9.

In another modification as shown in FIGS. 9 and 10, a leaf spring 29 is employed with one edge of the leaf spring 29 locked to a pulley receiver 23 and the opposite edge of the leaf spring 29 is locked to a pulley 25. Utilizing the variations of bending of the leaf spring due to relative rotation of the pulley and the pulley receiver, the stop 28 is protruded and returned to its former position.

As is apparent from the above description, according to the invention, when the pull string is pulled to stop the operation of the music box, the pulley idles with respect to the spring winding shaft, whereby the pulley is moved in the axial direction to cause the stop to move into the region of rotation of the governor plate thereby to stop the operation of the music box. In other words, the stop is operated by the idling operation of the pulley. Therefore, the operation of the music box can be stopped by pulling the string with a small force. Thus, even a small child can stop the operation of the music box.

What is claimed is:
1. A coil spring winding mechanism comprising:
a coil spring:
coil spring winding means for winding said coil spring; a driven member driven by the unwinding force of said coil spring;
a locking member movable in and out of a drive region of said driven member;
an elastic member urging said locking member to move out of said drive region of said driven member; and means for moving said locking member into said drive region of said driven member against an elastic force of said elastic member during winding of said coil spring and preventing winding of said coil spring when said locking member out of said drive region of said driven member.

2. The mechanism as claimed in claim 1, in which said locking member is integral with said elastic member.

3. The mechanism as claimed in claim 1, further comprising a speed increasing mechanism for driving said driven member.

4. The mechanism as claimed in claim 3, in which said driven member comprises an air braking type speed governor plate.

5. The mechanism as claimed in claim 1, in which the unwinding force of said coil spring drives said driven member.

6. The mechanism as claimed in claim 2, in which said coil spring, driven member, locking member and elastic member are mounted in a case.

7. The mechanism as claimed in claim 6, in which said coil spring winding means comprises a string and a string winding drum, said string being pulled out of said case through a small hole formed in said case with one end of said string tied to said string winding drum.

8. The mechanism as claimed in claim 7, in which said locking member has an engaging member with which said string is engaged, so that, when said string is pulled, said locking member is pulled in the string pulling direction.

9. The mechanism as claimed in claim 8, further comprising a coil spring winding shaft, said string winding drum being fixedly secured to said coil spring winding shaft.

10. The mechanism as claimed in claim 7, further comprising a coil spring winding shaft, said string winding drum being loosely fitted onto said coil spring winding shaft so that, when said string is pulled, said string winding drum idles with respect to said coil spring winding shaft and said string winding drum is moved a predetermined distance in an axial direction of said shaft through during idling, thereby moving said locking member.

11. The mechanism as claimed in claim 1 or 8, further comprising a coil spring winding shaft, and wherein the unwinding force of said coil spring drives said driven member, and said string winding drum is fixedly secured to said coil spring winding shaft.

12. The mechanism as claimed in claim 1 or 7, further comprising a coil spring winding shaft and wherein said unwinding force of said coil spring drives said driven member, and in which said string winding drum is loosely fitted onto said coil spring winding shaft so that when said string is pulled, said string winding drum idles with respect to said coil spring winding shaft and said string winding drum is moved a predetermined distance in an axial direction of said shaft during idling operating, thereby moving said locking member.

13. The mechanism as claimed in claim 1 or 4, wherein said locking member comprises a lever rotatably mounted at one end thereof and having an end portion engageable with said driven member at an opposite end thereof, and a pulley rotatably mounted on a center portion of said lever, and wherein said coil spring winding means comprises a string laid around said pulley.

14. The mechanism as claimed in claim 6, wherein said locking member and said elastic member comprise an annular plate having a plurality of elastic legs extending obliquely therefrom and a rod protruding therefrom substantially perpendicularly to said annular plate.

15. The mechanism as claimed in claim 14, wherein said coil spring winding means comprises a pulley having a plurality of engaging protrusions formed on an inner circumference thereof and a pulley receiver mounted coaxially with said pulley and substantially within said pulley, said pulley receiver being substantially cylindrical with a plurality of recesses formed in an outer cylindrical surface thereof, said recesses being equal in number to the number of said engaging protrusions of said pulley, each said recess having a following edge extending substantially parallel to an axial direction of said pulley receiver and a slope edge and a blocking edge merging with said slope edge opposite said following edge.

16. The mechanism as claimed in claim 1, in which said coil spring winding means comprises a string and a string winding drum, and wherein said elastic member comprises a coil spring mounted coaxially with said string winding drum and urging said string winding drum axially in a first direction, and wherein said locking member comprises a frame having a stopping portion fixedly mounted and a free portion disposed to move and in and out of said drive region of said driven member in response to movement of said string winding drum in a second direction opposite said first direction.

17. The mechanism as claimed in claim 1, wherein said coil spring winding means comprises a string and a string winding drum, wherein said elastic member comprises a leaf spring having edge portions coupled to said string winding drum for urging said string winding drum in a first axial direction, and wherein a center portion of said leaf spring abuts said locking member.

* * * * *